Figure 1:
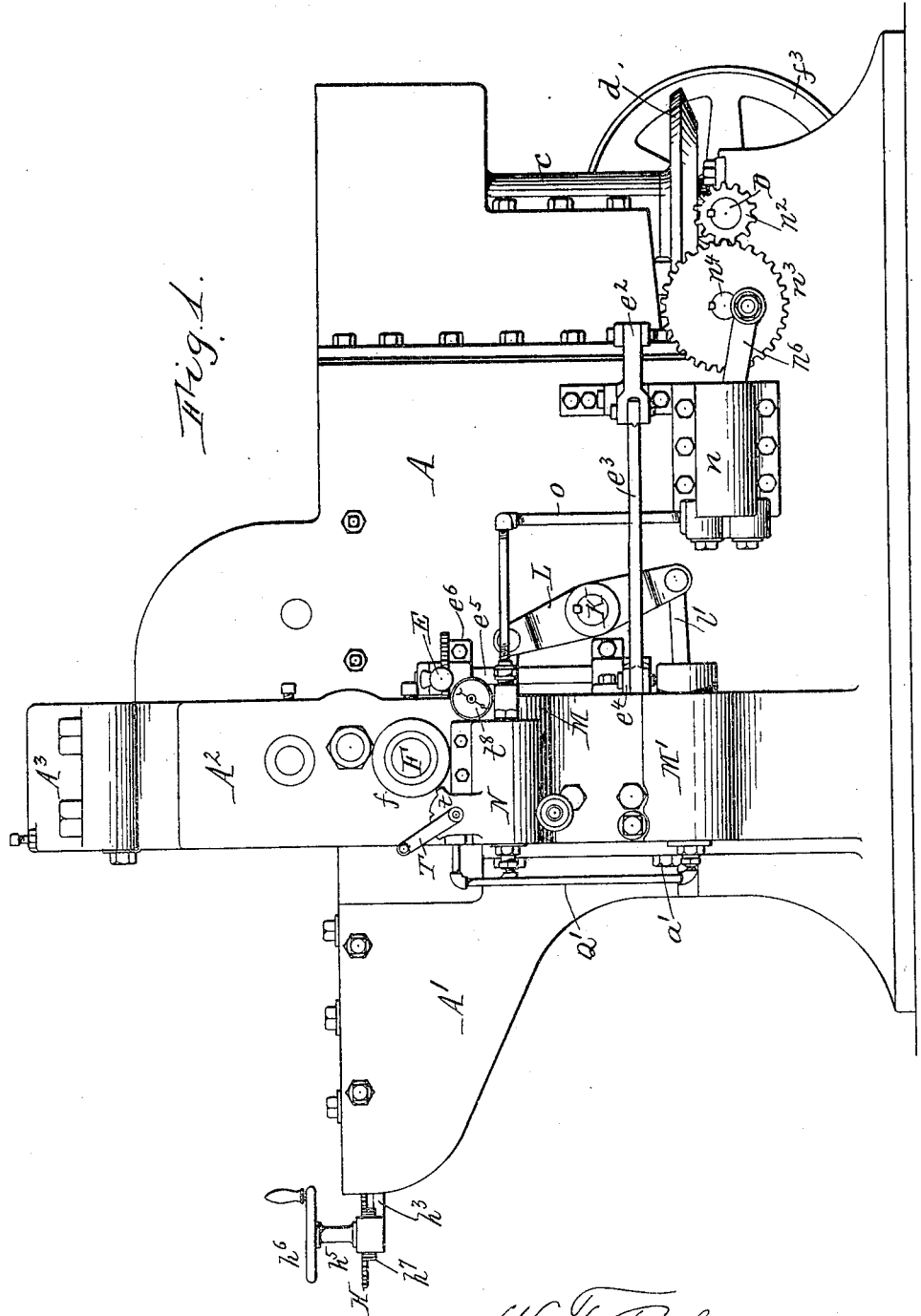

No. 812,295.

PATENTED FEB. 13, 1906.

W. F. RICHARDS.
MACHINE FOR MAKING BATTERY GRIDS.
APPLICATION FILED DEC. 3, 1901.

8 SHEETS—SHEET 4.

Witnesses:
E. A. Volk.
F. F. Schuyler.

W. F. Richards, Inventor.
By Wilhelm Bonner
Attorneys

No. 812,295. PATENTED FEB. 13, 1906.
W. F. RICHARDS.
MACHINE FOR MAKING BATTERY GRIDS.
APPLICATION FILED DEC. 3, 1901.

8 SHEETS—SHEET 5.

Witnesses:
E. A. Volk.
F. F. Schupigi

W. F. Richards, Inventor.
By Wilhelm Bonner
Attorneys.

No. 812,295. PATENTED FEB. 13, 1906.
W. F. RICHARDS.
MACHINE FOR MAKING BATTERY GRIDS.
APPLICATION FILED DEC. 3, 1901.
8 SHEETS—SHEET 6.
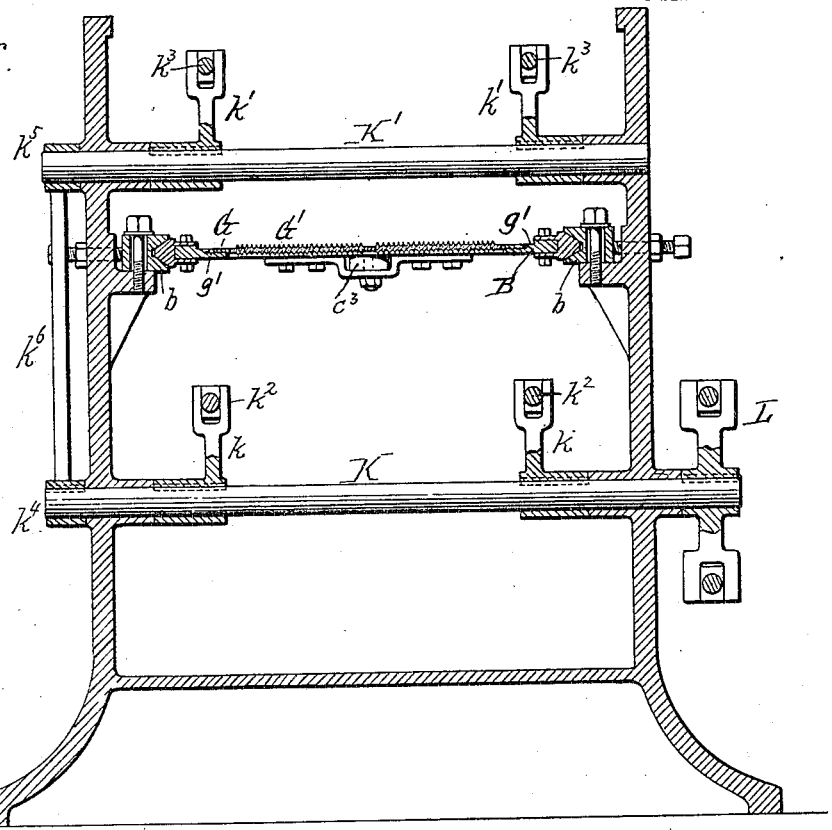
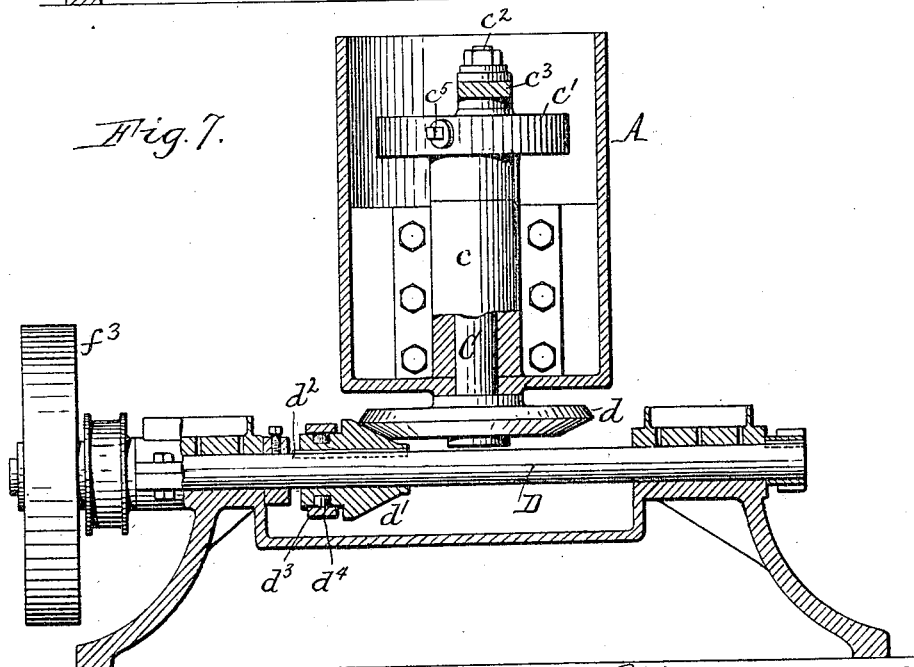

No. 812,295.  
PATENTED FEB. 13, 1906.  
W. F. RICHARDS.  
MACHINE FOR MAKING BATTERY GRIDS.  
APPLICATION FILED DEC. 3, 1901.  
8 SHEETS—SHEET 7.
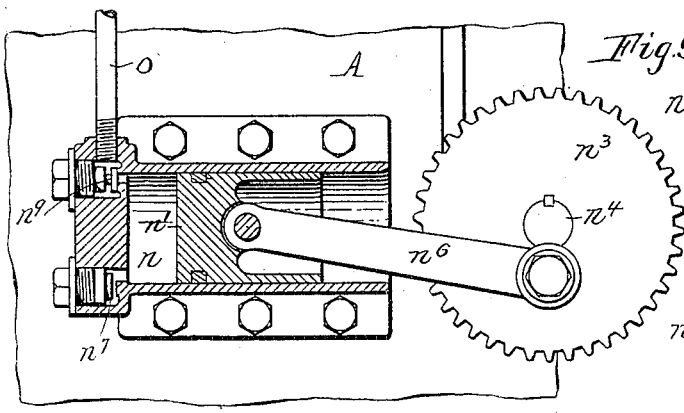
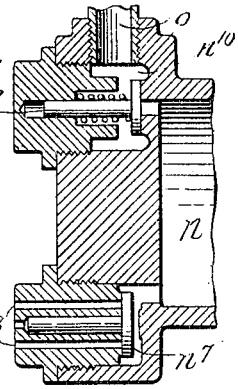
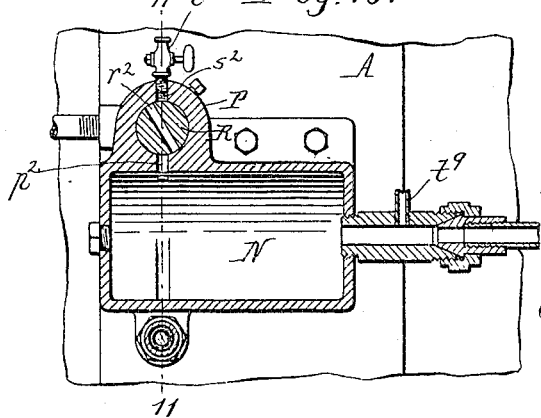
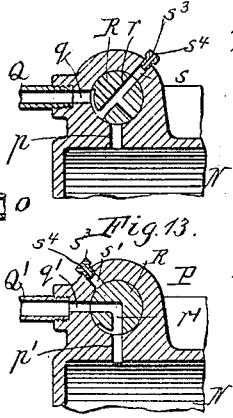
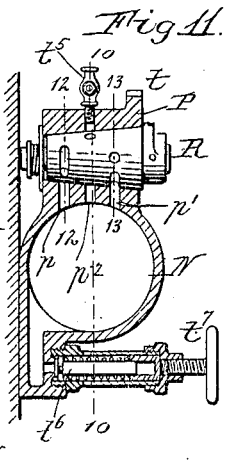
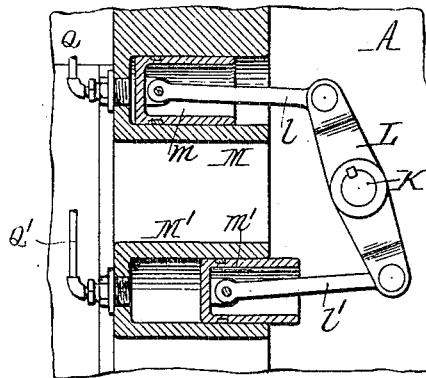
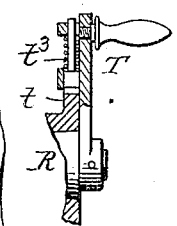
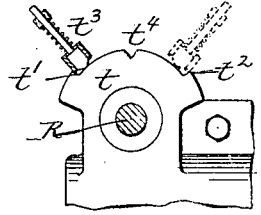
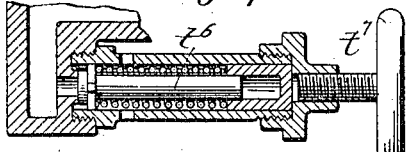
Witnesses:  
E. A. Volk.  
F. F. Schuyler.
W. F. Richards, Inventor.  
By Wilhelm Bonner,  
Attorneys.

No. 812,295. PATENTED FEB. 13, 1906.
W. F. RICHARDS.
MACHINE FOR MAKING BATTERY GRIDS.
APPLICATION FILED DEC. 3, 1901.

8 SHEETS—SHEET 8.

Witnesses,
E. A. Volk.
F. F. Schyunger

W. F. Richards,
Inventor;
by Wilhelm Bonner
Attorneys,

UNITED STATES PATENT OFFICE.

WILLARD F. RICHARDS, OF BUFFALO, NEW YORK, ASSIGNOR TO GOULD STORAGE BATTERY COMPANY, OF NEW YORK, N. Y., A CORPORATION OF WEST VIRGINIA.

MACHINE FOR MAKING BATTERY-GRIDS.

No. 812,295.      Specification of Letters Patent.      Patented Feb. 13, 1906.

Application filed December 3, 1901. Serial No. 84,565.

*To all whom it may concern:*

Be it known that I, WILLARD F. RICHARDS, a citizen of the United States, residing at Buffalo, in the county of Erie and State of New York, have invented new and useful Improvements in Machines for Making Battery-Grids, of which the following is a specification.

This invention relates to a machine for making that type of secondary - battery plates or grids which are provided with numerous parallel ribs or leaves between which the active material is confined and which are spun on the blank or flat lead plate by reciprocating the same between a pair of spinning-rollers constructed usually of numerous thin separated disks which penetrate the blank and displace the metal in such a manner as to raise the ribs or leaves on the same. A machine of this character is shown and described in my application for United States Letters Patent filed October 5, 1900, Serial No. 32,177.

One object of the present invention is to produce an improved machine of this type in which the liability of injury to the machine or grids owing to unskilful handling of the machine is reduced to a minimum and in which in the event of choking or clogging of the spinning-rollers injury to the same or other parts of the machine is avoided; also, to render it impossible for the operator to throw the spinning-rollers against the plate with too sudden or too great a pressure.

A further object is to so mount and connect the spinning-rollers that they counterbalance each other, and thus prevent one roll from penetrating deeper into the blank than the other.

Another object is to provide means whereby the pressure on the spinning-rollers can be accurately changed to suit different work quickly and without exertion on the part of the operator.

Other objects will appear from the following description.

Figure 2:
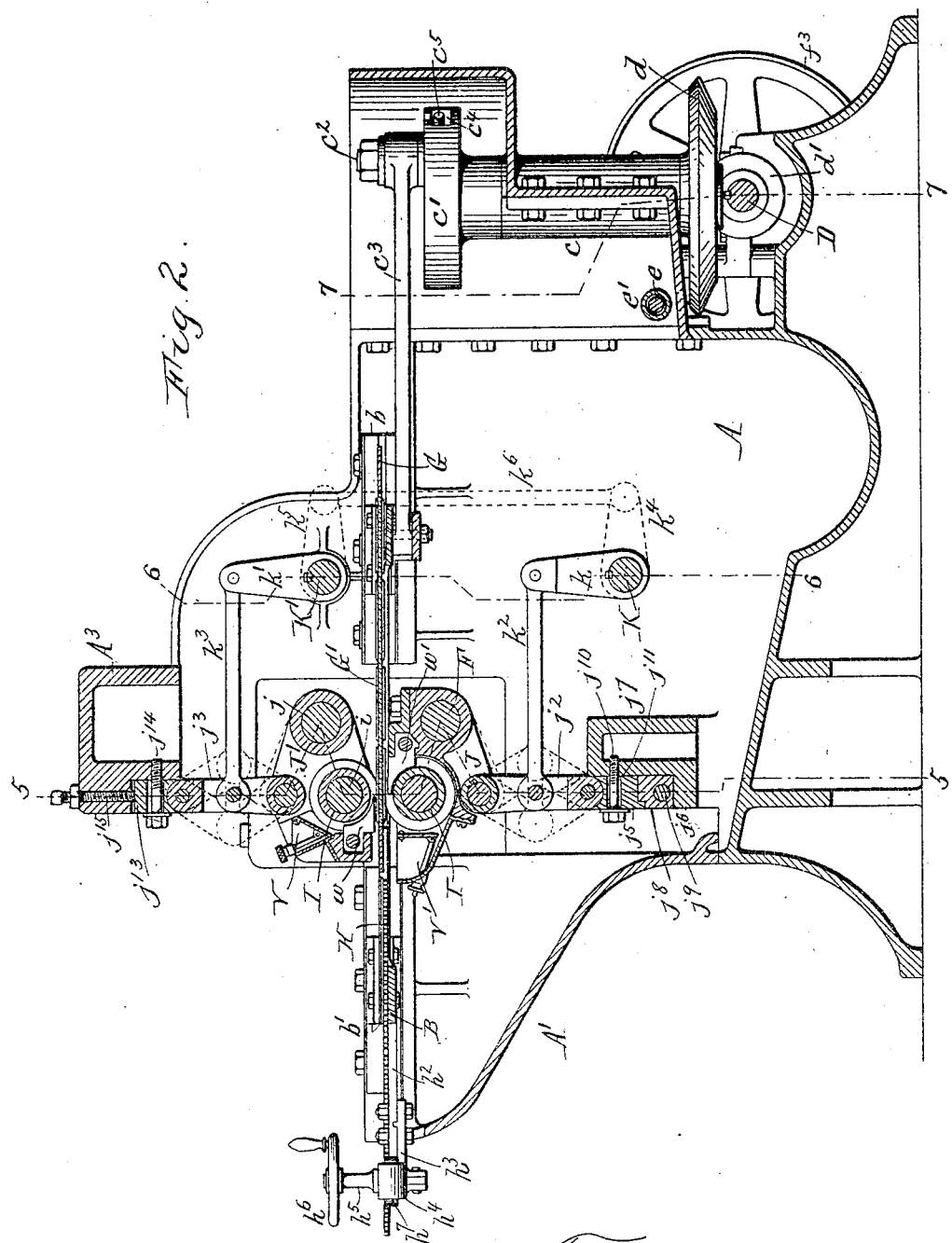
Figure 3:
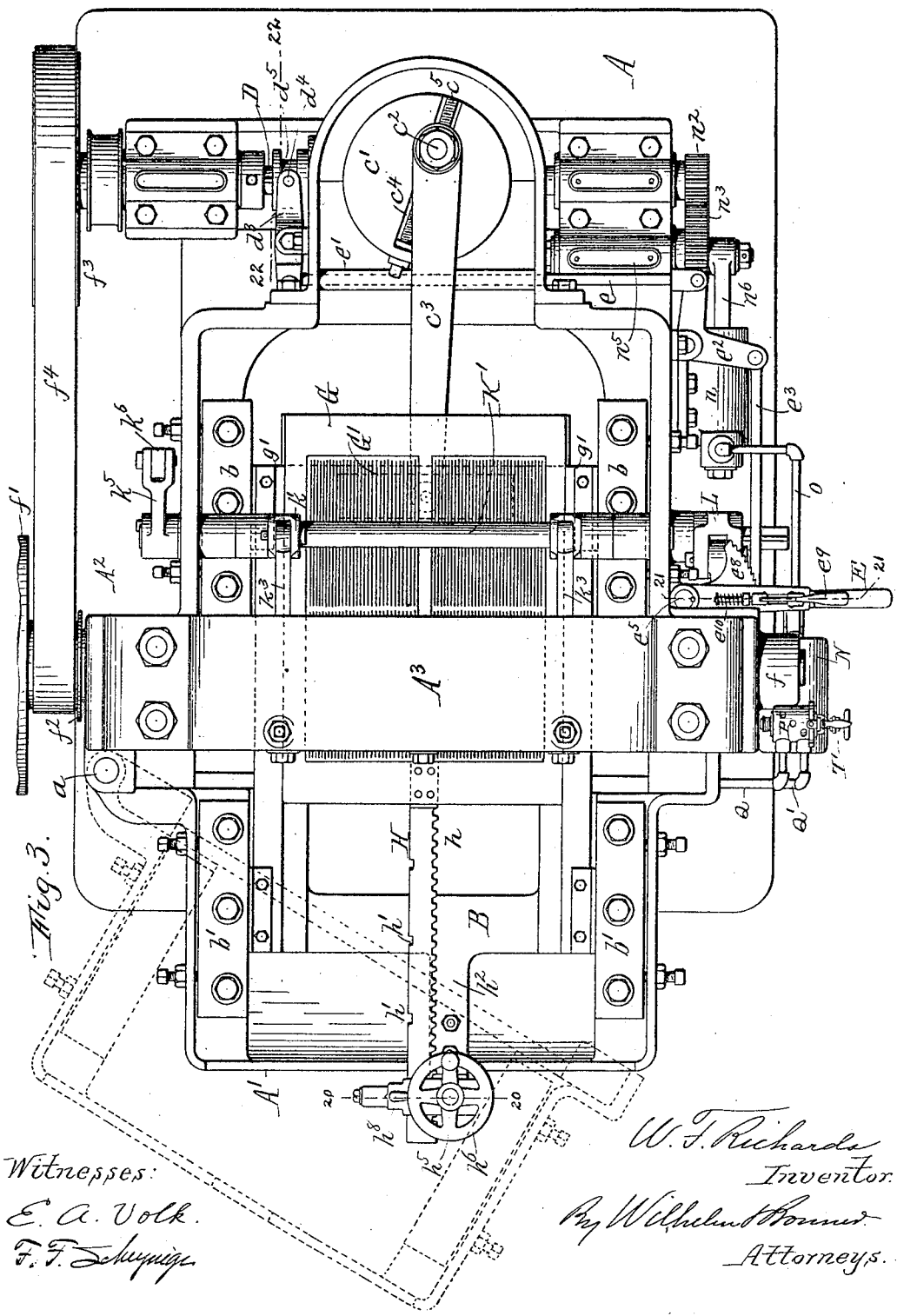
Figure 4:
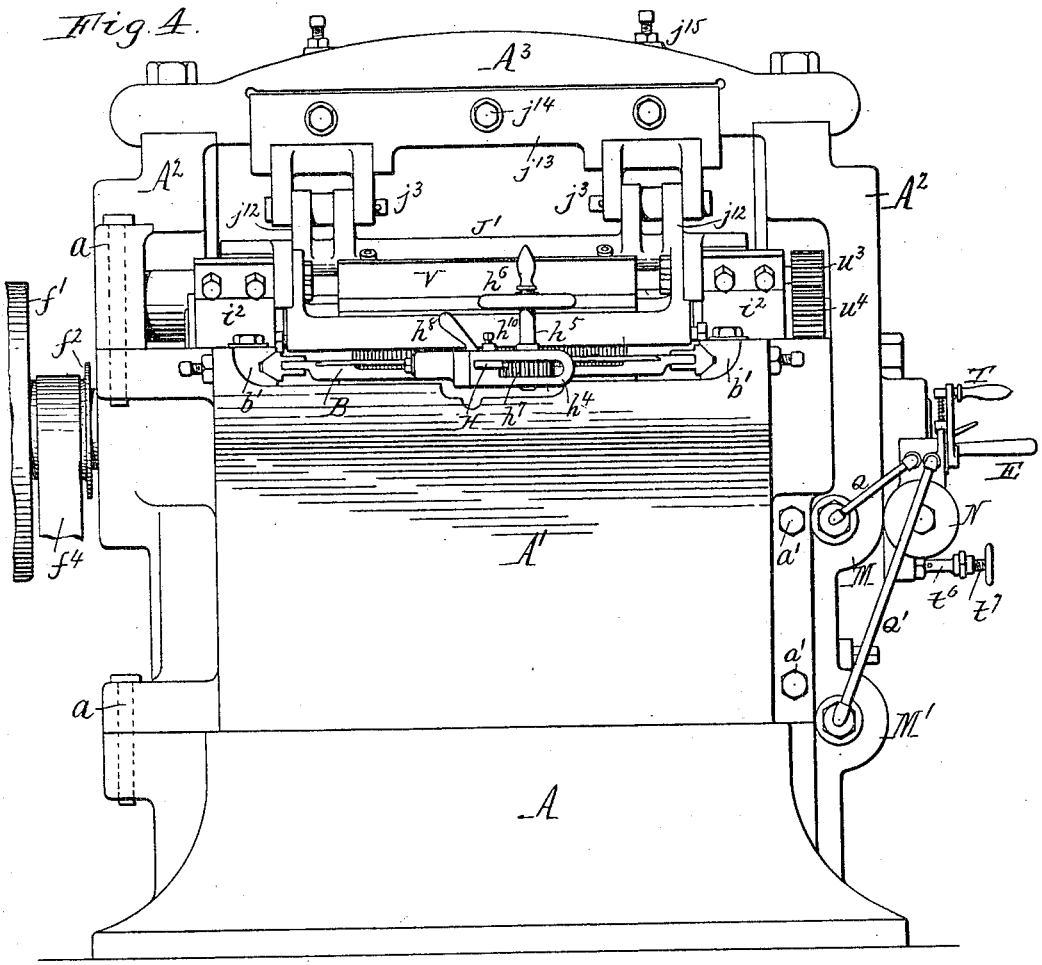
Figure 18:
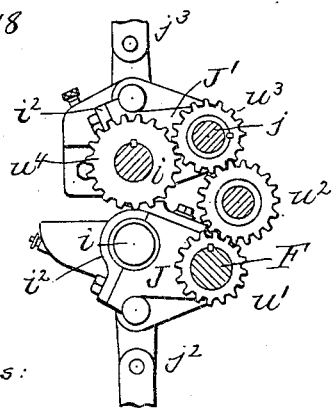
Figure 19:
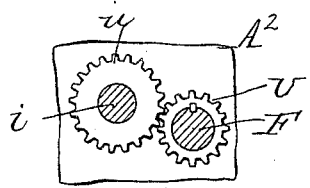
Figure 5:
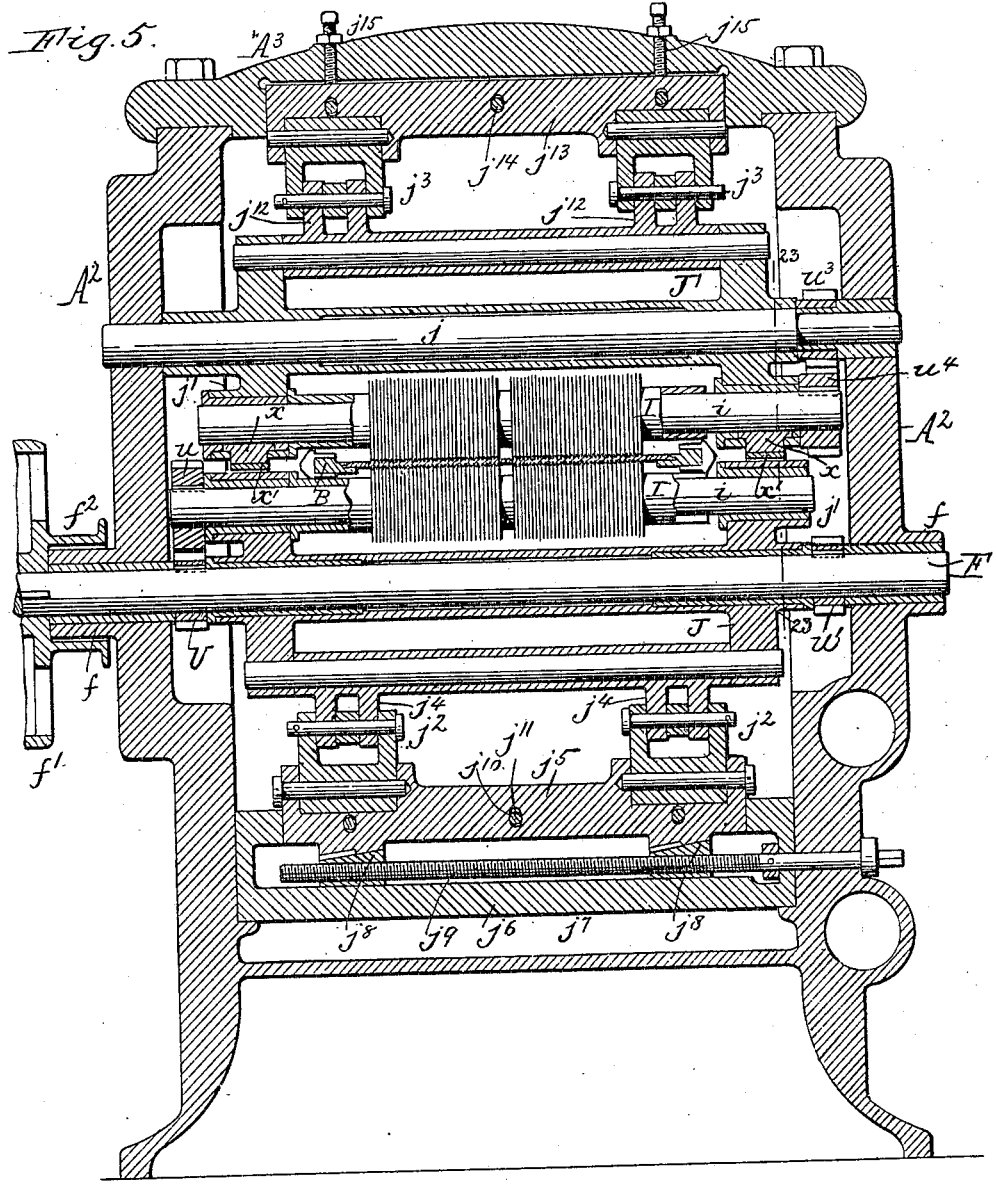
Figure 20:
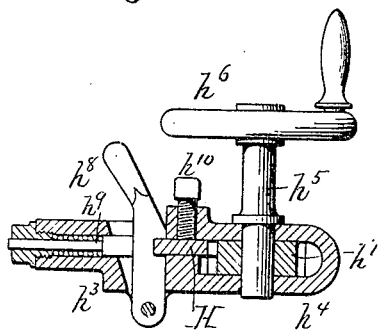
Figure 23:
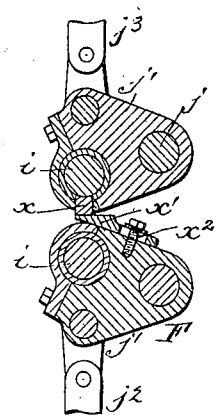
Figure 21:
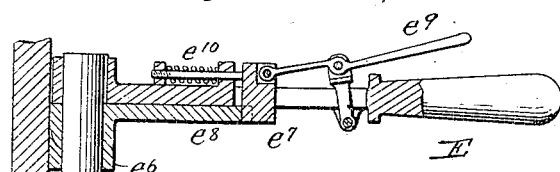
Figure 22:
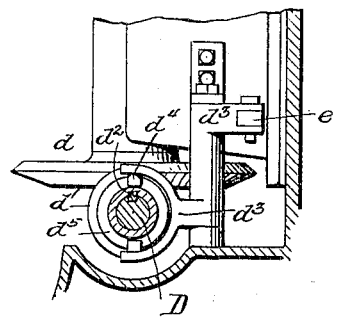

In the accompanying drawings, consisting of eight sheets, Figure 1 is an elevational view of one side of a machine, illustrating my invention. Fig. 2 is a vertical longitudinal sectional elevation thereof. Fig. 3 is a top plan view thereof. Fig. 4 is an elevation of the front end thereof. Fig. 5 is a vertical transverse sectional view substantially in line 5 5, Fig. 2. Fig. 6 is a transverse sectional view in line 6 6, Fig. 2. Fig. 7 is a transverse vertical sectional elevation substantially in line 7 7, Fig. 2. Fig. 8 is an enlarged sectional elevation of the air-pump. Fig. 9 is an enlarged sectional view through the pump-valve chambers. Fig. 10 is an enlarged vertical sectional view through the air-reservoir substantially in line 10 10, Fig. 11. Fig. 11 is a transverse sectional elevation substantially in line 11 11, Fig. 10. Fig. 12 is a sectional view in line 12 12, Fig. 11. Fig. 13 is a sectional view in line 13 13, Fig. 11. Fig. 14 is a vertical sectional view through the pneumatic cylinders. Figs. 15 and 16 are enlarged detail views of the holding - pawl and segment for the controlling-valve. Fig. 17 is an enlarged sectional view of the relief-valve. Fig. 18 is an enlarged sectional view showing the driving-gears for the upper roller. Fig. 19 is a fragmentary view showing the driving-gear for the lower roller. Fig. 20 is an enlarged sectional elevation substantially in line 20 20, Fig. 3. Fig. 21 is an enlarged vertical sectional elevation in line 21 21, Fig. 3. Fig. 22 is a sectional elevation on the line 22 22, Fig. 3, showing the shifting-lever for the sliding friction gear-wheel. Fig. 23 is a section, on a reduced scale, through the bearings for the spinning-rollers on the line 23 23, Fig. 5.

Like letters of reference refer to like parts in the several figures.

Referring to the drawings, A indicates the main or stationary frame, which is generally rectangular in form.

A′ is a front swinging frame-section, which is hinged in any suitable manner, as at $a$, at one side of the main frame, so as to swing horizontally to one side, as indicated in dotted lines in Fig. 3. The frame - section constitutes when closed a part of the front wall of the frame and when swung open exposes the lower mechanism located inside of the main frame and permits ready access to the spinning-rollers for changing the same for different classes of work or for repairs. The frame-section A′ is held in closed position, as by means of bolts $a'$, passing through adjacent parts of the main frame and frame-section.

$A^2 A^2$ indicate standards arranged at opposite sides of the frame, near the front and rising above the same. The upper ends of the standards are connected by a horizontal yoke A³ or top frame, which surmounts the standards and is rigidly secured thereto.

B indicates a horizontal reciprocating head or frame for the grid plate or blank arranged lengthwise of the machine between the standards A². The head is guided in two pairs of longitudinal ways $b\ b$ and $b'\ b'$, Figs. 2, 3, and 6, the former being supported at opposite sides of the main frame in rear of the standards and the latter being supported at opposite sides of the front movable frame-section A'. These guideways are preferably made adjustable toward and from the reciprocating head.

The head-reciprocating mechanism (shown in the drawings) is constructed as follows: C indicates a vertical shaft journaled in a suitable bearing $c$ at the rear of the main frame and provided at its upper end with a crank-disk $c'$, having a crank or wrist pin $c^2$. A pitman $c^3$ connects the rear portion of the reciprocating head B with the wrist-pin $c^2$, as shown in Figs. 2 and 3, whereby the head is actuated. The wrist-pin is preferably adjustable on the crank-disk to lengthen or shorten the stroke of the head B in any suitable manner. For this purpose the wrist-pin may be carried by a block, (not shown,) which slides in a diametrically arranged groove $c^4$ in the face of the crank-disk and is adjusted by means of a screw $c^5$, as more fully described in my said application.

In the use of grid spinning-machines it has been found that owing to the great friction between the spinning-rollers and the grid the leaves of the latter are liable to adhere to the rollers and strip off and clog the rollers, which will injure the same or other parts of the machine unless the head-reciprocating mechanism is immediately stopped. To accomplish this, I preferably drive the shaft C by frictional gearing of any suitable type. In the construction illustrated the shaft C is driven from a transverse shaft D, arranged below the lower end thereof and journaled in suitable bearings in the main frame, by means of a bevel friction-gear $d$, secured to the lower end of the shaft C and contacting with a bevel friction-gear $d'$ on the shaft D, as shown in Figs. 2 and 7. In the event of clogging or choking, as above stated, the shaft D can continue its rotation, while the friction gear-wheel $d$ on the shaft C is permitted to slip on the friction gear-wheel $d'$, thus stopping the shaft C. The gear-wheel $d'$ is preferably made slidable on the shaft D and caused to rotate therewith by means of a feather or key $d^2$. $d^3$, Figs. 3, 7, and 22, is a lever pivoted intermediate of its ends on the main frame and having a bifurcated rear end which straddles the hub of the gear $d'$ and is provided with pins $d^4$, which enter a circular groove $d^5$ in the hub. The opposite or forward end of the lever is connected to one end of a transverse horizontal rod $e$, which slides in a tubular bearing $e'$, secured to the frame, the other end of which rod is connected to one arm of a bell-crank lever $e^2$, pivoted on the side of the main frame. (See Figs. 1 and 3.) The other arm of the bell-crank lever is connected to the rear end of a forwardly-extending rod $e^3$, the front end of which is connected to an arm $e^4$, (see Fig. 21,) secured to the lower end of an upright shaft $e^5$. This shaft is journaled in suitable bearings $e^6$ on the side of the main frame and has secured to its upper end an operating-lever E, by means of which the connections just described and the friction-gear $d'$ is thrown into contact with the friction-gear $d$ for driving the shaft C or out of contact therewith to stop the shaft and bring the reciprocating bed to rest when it is desired to insert or remove a grid-plate or shift the same to a different position in the head. Any suitable means may be employed for holding the lever E in adjusted positions. In Fig. 21 I have shown for this purpose a sliding pawl $e^7$, mounted on the lever and adapted to engage in notches or serrations in the outer curved edge of a stationary segment $e^8$, secured to or formed with the upper bearing $e^6$. $e^9$ indicates an operating trip-handle for said pawl, and $e^{10}$ a spring for yieldingly holding the pawl in engagement with the notches in the segment.

F indicates the main drive-shaft, which is arranged transversely of the machine and journaled in suitable bearings $f$ in the standards A² below the reciprocating head. The shaft F is provided at one end with a drive-belt pulley $f'$ and with a belt-pulley $f^2$, on which and on a pulley $f^3$ on one end of the shaft D runs a belt $f^4$, by means of which the shaft D is driven.

G indicates an open frame or grid-holder which is mounted in the reciprocating head B and which carries the lead grid plate or plates, (indicated at G'.) The holder G is provided with an opening or openings of the proper form to snugly receive the plate or plates and with turn-buttons or other suitable means for retaining the plates in the holder. The holder shown is intended to accommodate two plates arranged side by side therein. The holder is longitudinally adjustable in longitudinal guides $g'$ at opposite sides of the reciprocating head, so that the same can be shifted to present different portions of the grid-plate to the spinning-rollers.

The leaves of the grids are usually arranged in separate sections or divisions on the same, and in order to prevent loss of time in shifting and securing the holder, so as to present the proper portion of the grid-plate to the spinning-rollers for a desired division, suitable means should be provided. The adjusting device for this purpose (shown in the drawings) is constructed as follows: H indicates a horizontal rack-bar secured at its rear end to the central portion of the forward end of the holder G in any preferred manner and extending forwardly therefrom. The rack-bar is provided on one edge with teeth $h$ and on the opposite edge with stop notches or shoulders $h'$. $h^2$ indicates an arm secured to or formed with the forward part of the reciprocating head B and extending forwardly therefrom in a plane below the rack-bar H, as shown in Figs. 2 and 3. A bracket $h^3$ is secured in any suitable manner to the forward end of the arm $h^2$ and is provided with upper and lower bearing-plates $h^4$, between which the forward end of the rack-bar is guided. Journaled in suitable openings in the bearing-plates is a vertical operating-shaft $h^5$, provided at its upper end with a crank handle or wheel $h^6$. $h^7$, Figs. 4 and 20, is a gear-pinion secured to the shaft $h^5$ between said upper and lower bearing-plates and meshing with the teeth of said rack-bar, so as to move the same forward or backward by the turning of the handle or wheel $h^6$. $h^8$ indicates a latch-lever pivoted at its lower end to the bracket $h^3$ and extending up through an opening in the bracket adjacent to the rack-bar H. The lever is held toward or against the notched edge of said rack-bar by means of a spring-pressed plunger $h^9$ slidably confined in a pocket in the bracket $h^3$ and engaging the lever. When the rack-bar is moved by said operating-pinion until one of the notches $h'$ is opposite said latch, the latter will spring into said notch and hold the rack-bar from further movement. $h^{10}$ indicates a lock-bolt screwed into an opening in the upper bearing-plate and adapted to engage the rack-bar. This bolt affords means for holding the rack-bar in any desired position. Preferably as many notches $h'$ are provided as it is desired to have sections or divisions of ribs on the grid, and the arrangement of the notches is such that when the latch is in engagement with one of them the blank is in proper position relative to the spinning-rollers to cause the same to operate on the desired portion of the blank.

I I represent the spinning-rollers, which are arranged horizontally above and below the reciprocating head B and which may consist, as usual, of thin disks mounted side by side on the shaft $i$ of the rollers, with spacing-washers arranged between the disks. These rollers are movable toward and from each other, for which purpose the shafts $i$ are preferably journaled at their opposite ends in lower and upper horizontal vertically-swinging frames J J'. The lower frame J is mounted on the main driving-shaft F between the main-frame sides, so as to swing or rock vertically. The upper frame J' is similarly supported on a shaft $j$, arranged above and parallel with the main drive-shaft F and journaled at its ends in suitable bearings in the standards $A^2$. The swinging frames J J' are provided at or near their opposite ends, respectively, with upwardly and downwardly extending arms or bearings $j'$, in which the rollers I I are journaled. The rollers are detachable from their bearings in any suitable manner, enabling them to be quickly removed. In Fig. 18 detachable bearing-caps $i^2$, bolted to the fixed parts of the bearings, are shown for this purpose. Each of the frames J J' is preferably operated by a pair of vertical toggles, (indicated, respectively, at $j^2$ and $j^3$.) The toggles $j^2$ for the lower frame are pivoted at their upper ends to depending arms $j^4$ on the swinging frame J and at their lower ends to lugs on an adjusting-block $j^5$, which is arranged transversely of the machine above a horizontal ledge or shelf $j^6$ on the lower part of a transverse frame-bar $j^7$. Between the ledge and adjusting-block (see Figs. 2 and 5) are wedges $j^8$, slidable longitudinally relative to the adjusting-block and provided with screw-threaded openings in which works a screw-threaded transverse rod $j^9$, journaled and held from lengthwise movement in a bearing-opening in one side of the frame, the outer end of the rod being fashioned to receive a turning wrench or tool. By turning the screw-rod the wedges are operated and the adjusting-block is moved up or down to adjust the rollers nearer to or farther from the blank, so that they will penetrate the latter more or less, as desired. $j^{10}$ indicates clamping-bolts passing through slots $j^{11}$ in the adjusting-block into the transverse frame-bar $j^7$ for firmly holding the adjusting-block after adjustment. The upper toggles $j^3$ are similarly pivoted to arms $j^{12}$ on the upper swinging frame and to lugs on an adjusting-block $j^{13}$, supported by horizontal bolts $j^{14}$, extending through slots in the adjusting-block into the lower part of the yoke $A^3$, and they are adjusted after loosening said bolts by means of vertical bolts $j^{15}$, working in holes in an overhanging part of the yoke $A^3$.

The toggles are operated to swing the frames J and J' for moving the rollers toward and from the grid-blank by suitable mechanism, preferably constructed as follows: K and K' indicate, respectively, transverse horizontal rock-shafts journaled below and above the reciprocating head in suitable bearings in the main frame. Said shafts are provided with rock-arms $k$ and $k'$, respectively. The rock-arms $k$ are connected by links or rods $k^2$ with the joints of the lower toggles, and the rock-arms $k'$ are connected by links or rods $k^3$ with the joints of the upper toggles. The lower rock-shaft is provided at one end with an arm $k^4$ and the upper shaft at the adjacent end is provided with a similar arm $k^5$, the outer ends of which arms are connected by a link or rod $k^6$, so that the shafts will rock together, as shown in Fig. 6. With the swinging frame, toggles, and connections arranged as described it will be readily understood that the weight of one roller and its frame practically counterbalances that of the other, so that little power is required to move the rollers toward and from each other, and the movement and pressure of both rollers are always equal.

L indicates a lever which is secured intermediate of its ends to the opposite end of the lower rock-shaft K. The opposite arms of the lever L are connected by means of pitmen or links $l\ l'$, respectively, with pistons $m$ and $m'$, arranged in upper and lower fluid-cylinders M and M', preferably arranged one above the other on one side of the main frame. By the reciprocation of the pistons $m$ and $m'$ in opposite directions the rock-arms $k$ and $k'$ through the connection just described are rocked. The mechanism for alternately supplying said cylinders with fluid-pressure and exhausting the same for reciprocating said pistons is preferably as follows: N, Figs. 1, 10, and 11, indicates a reservoir for an elastic fluid—for instance, air under pressure. The reservoir may be supplied by any suitable means, such as a pump, the cylinder thereof being shown at $n$, secured to a suitable part of the main frame. $n'$ is the piston arranged therein. The pump-piston is driven from any suitable part of the machine, such as the shaft D, by suitable gearing—for instance, a pinion $n^2$—secured to the shaft D, which meshes with a gear-wheel $n^3$, secured to a shaft $n^4$, journaled in a bearing $n^5$ on the main frame. The gear-wheel $n^3$ is provided with a crank or wrist pin connected by a pitman $n^6$ with the pump-piston $n'$. The pump is provided with a suitable inlet-valve $n^7$, controlling one or more admission-ports $n^8$, and with a discharge-valve $n^9$, controlling a discharge-port $n^{10}$, which is connected by a pipe $o$ with the fluid-reservoir N, as shown in Figs. 1 and 10. P indicates a valve-chamber adjacent to the reservoir N and connected therewith by means of three ports or passages $p\ p'\ p^2$ and also provided with two ports or passages $q$ and $q'$, (see Figs. 12 and 13,) the former of which communicates, by means of a pipe Q, with one end of the upper fluid-cylinder M and the latter by means of a pipe Q' with one end of the lower fluid-cylinder M', as shown in Figs. 1, 3, and 4. R indicates a valve, preferably a turn-plug, arranged in said valve-chamber for controlling said ports.

The valve-plug is provided with a diametrical passage $r$, connecting at one end with a groove in the circular face of the plug and connecting intermediate of its ends with a branch passage, a second angular passage $r'$, connecting at one end with a groove in the circular face of the plug, and a third diametrical passage $r^2$. In the position of the plug indicated in Figs. 10 to 13 the passage $r$ and its groove establish communication between the port $q$ and an exhaust-passage $s$ in the valve-casing, thus permitting the fluid from the upper cylinder M to exhaust through the pipe Q, while the passage $r'$ establishes communication between the port $p'$ and the port $q'$, thus permitting at the same time the passage of fluid from the reservoir to the lower cylinder M' through the pipe Q'. In this position of the plug the passage $r^2$ is closed. When the plug is turned to the position indicated by dotted lines in Fig. 15, the passage $r$ and its branch passage establish communication between ports $p$ and $q$, permitting the flow of the fluid from the reservoir through the pipe Q to the upper cylinder M, while the passage $r'$ and its groove establish communication between the port $q'$ and an exhaust-passage $s'$, arranged in the valve-chamber at an angle to the port $s$, thus permitting the lower cylinder M' to exhaust through the pipe Q'. In this position of the valve also the passage $r^2$ is closed. When the plug is moved to an intermediate position, the passage $r^2$ establishes communication between the port $p^2$ and a third exhaust-port $s^2$ in the valve-chamber intermediate of the ports $s$ and $s'$. Each of the exhaust-ports $s$ and $s'$ is provided with a nipple $s^3$, screwed therein and having a restricted orifice $s^4$. These small orifices $s^4$ permit only a slow and steady discharge or exhaust from the cylinders M and M'. Any other form of valve or arrangement of passages may be employed which will alternately connect one cylinder with the reservoir and the other with its exhaust.

As the pistons in the two cylinders are connected and move in opposite directions, when fluid under pressure is admitted to one cylinder its piston is forced outwardly and through the connections forces the other piston inwardly, causing the discharge from its cylinder; but the speed of the pistons is slow and steady, owing to the restricted discharge and is dependent on the size of the orifices $s^4$. The spinning-rollers cannot, therefore, be thrown suddenly or with uneven pressure against the grid-plate no matter how quickly the valve is moved, and the danger of injury to the rollers or plate is reduced to the minimum.

In order to enable the valve to be quickly shifted from one position to the other to effect the registration of the proper ports and passages, it is provided with a crank-handle T, which swings adjacent to a segment $t$, carried by the valve-chamber. The segment is provided with stop-shoulders $t'\ t^2$ at opposite ends adapted to engage a part of the handle T and stop the same respectively in the positions indicated in full and dotted lines in Fig. 15. The handle is provided with a spring-pressed bolt $t^3$, having a double-beveled end adapted to spring into a shallow notch $t^4$ in the segment midway between the shoulders $t'$ and $t^2$ to releasably hold the plug with the passage $r^2$ establishing communication between the ports $p^2$ and $s^2$. $t^5$ indicates a stop-cock for opening or closing the exhaust-port $s^2$ when it is desired to permit the discharge of the fluid from the reservoir and relieve the pump. $t^6$ indicates a spring-pressed relief or safety valve and regulator closing a port communicating with the reservoir and adapted to open and relieve the reservoir when the pressure of its spring is overpowered by the fluid-pressure in the reservoir. A hand adjusting-screw $t^7$ or the like is provided for regulating the tension of the spring, and thus regulating the pressure in the reservoir, and consequently the pressure exerted by the spinning-rollers on the grid-plate. The relief-valve adjuster therefore constitutes a simple device for quickly and exactly changing the pressure in the reservoir to suit the work being performed. $t^8$ represents a pressure-gage connected by a suitable pipe $t^9$ with the reservoir or the inlet-pipe thereto to indicate the reservoir-pressure.

The spinning-rollers are driven in any well-known manner. For this purpose I have shown, Figs. 5, 18, and 19, a gear-pinion U, secured to the main driving-shaft F at one end of the lower swinging frame J and meshing with a gear-wheel $u$, secured to the shaft of the lower roller. The upper spinning-roller is driven from the same shaft F by means of a pinion $u'$, secured thereto at the opposite end of the swinging frame J and intermeshing idler-gears $u^2$ and $u^3$, one of which meshes with the gear-wheel $u'$ and the other with a gear-wheel $u^4$, secured to the adjacent end of the shaft of the upper spinning-roller.

V indicates a lubricant-feed trough secured to the upper swinging frame adjacent to the upper spinning-roller, and V' is a similar lubricant-feed trough carried by the lower swinging frame adjacent to the lower roller. These lubricant-troughs may be of any suitable construction adapted to deliver the oil evenly to the entire width of the rollers.

$w\ w'$ indicate spacing-fingers secured to the upper and lower swinging frames, respectively, and projecting between the disks thereof just above and below the plate in the reciprocating head. These fingers maintain the edges of the disks in their true position and prevent injury thereto, which would occur if the edges were allowed to twist or lean sidewise.

Each of the bearing-arms $j'$ for the upper spinning-roller is provided with a hole below the roller-journal, in which is seated a stop-block $x$, bearing against the under side of the journal, and to each of the bearing-arms $j'$ for the lower spinning-roller is secured a wedge $x'$, adapted to bear against the under side of the stop-block to prevent the spinning-rollers from approaching each other too closely and cutting through the grid-blank. The wedge is adjustably secured by a screw-and-slot connection $x^2$, so that the extent of movement of the rollers toward each other can be regulated. The described arrangement also permits any wear in journals or bearings of the upper roller to be taken up, as the stop-blocks directly engage the upper-roller journals.

The operation of the machine is as follows: The plate-holder is moved forward and one or more grid plates or blanks, according to the capacity of the holder, are secured therein and the holder is adjusted in the reciprocating head by means of the rack-bar H and spring-latch $h^8$ in the manner before explained to bring the desired section of the grid-plate in operative position between the spinning-rollers. The lever E is then moved to throw the friction-gear $d'$ into contact with the friction-gear $d$, and the head B is thus started reciprocating. The valve-plug R is then turned, for instance, to the position indicated in the several figures to deliver the operating fluid from the reservoir N to the lower cylinder M' and its piston is caused to move gradually and steadily outward, as before explained, which rocks the rock-shaft K and through the described connections moves the toggles to their straightened position. (Indicated by full lines in the drawings.) After this position has been reached, in which the spinning-rollers are at the limit of their movement toward each other and have penetrated the plate to the desired extent, the continued movement of the lower piston and rock-shaft K in the same direction deflects the toggles forwardly, as indicated by dotted lines, thus automatically withdrawing the spinning-rollers from the plate. When the toggles have reached the limit of their forward movement, the operator throws the lever E to stop the reciprocating head, shifts the plate-holder to present the next section of the plate in operative position in the manner above explained, starts the reciprocating head again, and then turns the valve-plug R to the position indicated by dotted lines in Fig. 15. This places the reservoir in communication with the upper cylinder M and the lower cylinder in communication with its exhaust $s'$. The upper piston $m$ then moves gradually outward, causing the rock-shaft K to rock in the opposite direction and move the toggles rearwardly, whereby the spinning-rollers are moved toward each other and penetrate the plate and then move away from the plate until the toggles are at the limit of their rearward movement, similar to the operation in the forward movement of the toggles. The plate is then again shifted and the valve-plug turned again to the position indicated in the drawings. These operations are repeated until the desired number of sections or divisions on the grid-plates are cut, when the same are removed and replaced by new plates.

The toggles are adjusted to cause the penetration of the spinning-rollers to the desired depth by means of the upper and lower adjusting-blocks, and the pressure with which the rollers bear against the grid-plates is regulated to suit the work by adjusting the relief-valve by means of the hand-screw $t^7$.

The described arrangement of the fluid-pressure mechanism allows the valve to be shifted quickly and without care and yet permits only a steady gradual movement of the spinning-rollers to their work, the speed of which is governed by the size of the orifices in the exhaust-nipples $s$ and $s'$, which can be changed as desired.

I claim as my invention—

1. The combination of a grid-plate holder, a spinning-roll mounted to move toward the grid-plate in said holder, means for reciprocating one of said parts, means for driving said spinning-roll, a fluid-operated device for pressing said spinning-roll yieldingly toward the grid-plate in said holder and the movement of which is opposed by fluid-pressure, a valve controlling the operating fluid for said fluid-operated device, and means for gradually relieving said opposing pressure, whereby only a gradual movement of the spinning-roll toward the grid-plate is allowed regardless of the actuation of said valve, substantially as set forth.

2. The combination of a grid-plate holder, means for reciprocating the same, a spinning-roll mounted to move toward the grid-plate in said holder, means for driving said spinning-roll, a fluid-operated device for pressing said spinning-roll yieldingly toward the grid-plate in said holder, a valve for controlling the operating fluid for said device, and fluid-pressure means for retarding the movement of said device, whereby only a gradual movement of the spinning-roll toward the grid-plate is allowed regardless of the actuation of said valve, substantially as set forth.

3. The combination of a grid-plate holder, means for reciprocating the same, spinning-rolls mounted on opposite sides of said plate-holder to move toward the grid-plate in said holder, means for driving said spinning-rolls, fluid-operated mechanism for pressing said spinning-rolls yieldingly toward the grid-plate in said holder, a valve for admitting the operating fluid to said mechanism, and fluid-pressure means for retarding the movement of said mechanism, whereby only a gradual movement of the spinning-rolls toward the grid-plates is allowed regardless of the actuation of said valve, substantially as set forth.

4. The combination of a grid-plate holder, means for reciprocating the same, spinning-rolls mounted on opposite sides of said plate-holder to move toward the grid-plate in said holder, means for driving said spinning-rolls, a cylinder, a piston in said cylinder and connected to said spinning-rolls, a valve for admitting operating fluid to said cylinder to move said piston and press said spinning-rolls toward the grid-plate, the operative movement of said piston being opposed by fluid-pressure, and means for gradually relieving the pressure opposing the movement of said piston, whereby only a gradual movement of the spinning-rolls toward the grid-plates is allowed regardless of the actuation of said valve, substantially as set forth.

5. The combination of a grid-plate holder, spinning-rolls mounted on opposite sides of said plate-holder and movable toward the latter, means for driving said spinning-rolls, cylinders, fluid-operated pistons in said cylinders, means connecting said pistons to cause them to move oppositely, connections between said pistons and spinning-rolls whereby the latter are moved toward said plate-holder, a valve controlling the admission of operating fluid to said cylinders, and means for controlling the exhaust from said cylinders to cause a gradual movement of said pistons, substantially as set forth.

6. The combination of a grid-plate holder, rotary spinning-rolls movable toward and from said plate-holder, cylinders, connected fluid-operated pistons in said cylinders, connections between the same and said spinning-rolls for moving the latter toward the plate, a valve controlling the admission and exhaust of operating fluid to and from said cylinders alternately, and means for causing a gradual exhaust from said cylinders, substantially as set forth.

7. The combination of a reciprocating frame, a grid-plate holder supported by said frame, a bar projecting from one end of said grid-plate holder and constituting a handle therefor, a bracket secured to said reciprocating frame and in which said bar is guided, said bar having rack-teeth on one side and a series of stop-shoulders on another portion, a gear-pinion journaled in said bracket and meshing with said rack-teeth, an operating-handle for said pinion, and a spring-pressed latch mounted on said bracket and held against said bar and adapted to automatically engage with said stop-shoulders to arrest the movement of the grid-plate holder by said pinion, substantially as set forth.

8. The combination of a horizontal grid-plate holder, horizontal spinning-rolls arranged one above and one below said plate-holder, rock-shafts, connections between said rock-shafts and said spinning-rolls for moving the same toward and from each other, and means connecting said rock-shafts whereby the weight of one roll counterbalances that of the other, substantially as set forth.

9. The combination of a horizontal reciprocating grid-plate holder, horizontal spinning-rolls arranged one above and one below said plate-holder, toggles for moving said rolls toward and from each other, horizontal rock-shafts, connections between said rock-shafts and said toggles, and links connecting said rock-shafts whereby said rolls counterbalance each other, substantially as set forth.

Witness my hand this 30th day of October, 1901.

WILLARD F. RICHARDS.

Witnesses:
JNO. J. BONNER,
CLAUDIA M. BENTLEY.